United States Patent
Lecompere et al.

(10) Patent No.: US 12,248,298 B2
(45) Date of Patent: Mar. 11, 2025

(54) METHOD AND SYSTEM FOR OUTPUTTING A MANUFACTURING FILE FOR PRODUCING AN OPTICAL ELEMENT

(71) Applicant: Essilor International, Charenton-le-Pont (FR)

(72) Inventors: Maxime Lecompere, Charenton-le-Pont (FR); Pierre Leite, Charenton-le-Pont (FR); Manuel Theodet, Charenton-le-Pont (FR); Loïc Quere, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 469 days.

(21) Appl. No.: 17/621,514

(22) PCT Filed: Jun. 23, 2020

(86) PCT No.: PCT/EP2020/067538
§ 371 (c)(1),
(2) Date: Dec. 21, 2021

(87) PCT Pub. No.: WO2020/260305
PCT Pub. Date: Dec. 30, 2020

(65) Prior Publication Data
US 2022/0350304 A1    Nov. 3, 2022

(30) Foreign Application Priority Data

Jun. 24, 2019 (EP) .................................... 19305830

(51) Int. Cl.
*G05B 19/4099* (2006.01)
(52) U.S. Cl.
CPC .............................. *G05B 19/4099* (2013.01)

(58) Field of Classification Search
CPC .............. G05B 19/4099; B29C 64/393; B29D 11/00009; B29D 11/00432; H04N 1/32101; B33Y 50/02; G06F 30/17; G06F 2113/26
See application file for complete search history.

(56) References Cited

U.S. PATENT DOCUMENTS

| 4,575,330 A | 3/1986 | Hull |
| 5,089,184 A | 2/1992 | Hirano et al. |

(Continued)

FOREIGN PATENT DOCUMENTS

| CN | 108170007 | 6/2018 |
| CN | 108274745 | 2/2021 |

(Continued)

OTHER PUBLICATIONS

Joe Bennett, Measuring UV curing parameters of commercial photopolymers used in additive manufacturing, Additive Manufacturing, vol. 18, 2017, pp. 203-212 (Year: 2017).*

(Continued)

*Primary Examiner* — Christopher E. Everett
(74) *Attorney, Agent, or Firm* — Norton Rose Fulbright US LLP

(57) ABSTRACT

The invention relates to a method for outputting a manufacturing file for producing an optical element (100) from a curable material (50) by using an additive manufacturing technology, comprising the steps of:—acquiring the desired geometry of the optical element,—obtaining a discretization of the desired geometry in volume units described by data relative to position parameters of the volume units and to the dimension of the volume units,—associating at least a volume unit with a kinetic parameter that relates to the curing pace imposed to the curable material of the volume unit,—producing, using at least one processor, a manufacturing file comprising said data and said kinetic parameter (Continued)

for manufacturing at least the optical element, and—outputting said manufacturing file.

17 Claims, 4 Drawing Sheets

(56) References Cited

U.S. PATENT DOCUMENTS

| | | | |
|---|---|---|---|
| 5,104,592 | A | 4/1992 | Hull |
| 9,937,664 | B2 | 4/2018 | Theil et al. |
| 9,969,135 | B2 | 5/2018 | Valeri et al. |
| 10,137,645 | B2 | 11/2018 | Quere et al. |
| 10,363,710 | B2 | 7/2019 | Rodriguez et al. |
| 10,442,146 | B2 | 10/2019 | Gourraud |
| 10,459,247 | B2 | 10/2019 | Anatole et al. |
| 10,870,239 | B2 | 12/2020 | Fenley et al. |
| 11,511,483 | B2 | 11/2022 | Theodet |
| 11,548,215 | B2 | 1/2023 | Soppera et al. |
| 2005/0248062 | A1 | 11/2005 | Shkolnik et al. |
| 2011/0196529 | A1 | 8/2011 | Shkolnik et al. |
| 2012/0219698 | A1* | 8/2012 | Steingart ............ A61C 13/0019 427/258 |
| 2014/0042683 | A1 | 2/2014 | Kiridena et al. |
| 2015/0130114 | A1 | 5/2015 | Joyce |
| 2016/0114530 | A1 | 4/2016 | Thiel et al. |
| 2016/0114542 | A1 | 4/2016 | Quere et al. |
| 2016/0221262 | A1* | 8/2016 | Das ........................ B22C 9/24 |
| 2016/0244628 | A1* | 8/2016 | Breton .................. C09D 11/12 |
| 2017/0012679 | A1 | 4/2017 | Greene et al. |
| 2017/0146822 | A1 | 5/2017 | Wildsmith et al. |
| 2017/0210072 | A1 | 7/2017 | Rodriguez et al. |
| 2018/0056604 | A1 | 3/2018 | Sands et al. |
| 2018/0339397 | A1 | 11/2018 | Redfield |
| 2018/0370149 | A1 | 12/2018 | Ishibe |
| 2021/0387431 | A1 | 12/2021 | Baudart et al. |
| 2022/0118705 | A1 | 4/2022 | Lecompere et al. |
| 2022/0347917 | A1 | 11/2022 | Lecompere et al. |
| 2022/0350304 | A1 | 11/2022 | Lecompere et al. |
| 2023/0041524 | A1 | 2/2023 | Lecompere et al. |

FOREIGN PATENT DOCUMENTS

| | | |
|---|---|---|
| GB | 2477828 | 8/2011 |
| JP | H05-154924 | 6/1993 |
| JP | 2004-025843 | 1/2004 |
| JP | 2007-536131 | 12/2007 |
| JP | 2016-530127 | 9/2016 |
| JP | 2017-159557 | 9/2017 |
| WO | WO2017/055747 | 4/2017 |
| WO | WO2017/127334 | 7/2017 |
| WO | WO2019/002905 | 1/2019 |
| WO | WO2020/169837 | 8/2020 |
| WO | WO2020/260306 | 12/2020 |

OTHER PUBLICATIONS

International Search Report & Written Opinion issued in priority application PCT/EP2020/067538, dated Sep. 2, 2020.
International Search Report & Written Opinion issued in related application PCT/EP2020/067539, dated Sep. 1, 2020.
International Search Report & Written Opinion issued in related application PCT/EP2020/054696, dated Jul. 3, 2020.
Rank et al., "3D Printing of Optics", ISBN: 9781510619982, 2018.
Vitale et al., "Frontal Conversion and Uniformity in 3D Printing by Photopolymerisation", Materials, 2016, (9)760, pp. 1-13.
Xu et al., "Mask Image Planning for Deformation Control in Projection-Based Stereolithography Process", Journal of Manufacturing Science and Engineering, vol. 137, Jun. 2015, 12 pages.
Office Action issued in corresponding U.S. Appl. No. 17/621,510, dated Apr. 12, 2024.
Office Action in Corresponding U.S. Appl. No. 17/621,510 dated Oct. 11, 2024.
Young, et al. "GPU-accelerated generation and rendering of multi-level voxel representations of solid models", Computers & Graphics, vol. 75, pp. 11-24, 2018.

* cited by examiner

METHOD AND SYSTEM FOR OUTPUTTING A MANUFACTURING FILE FOR PRODUCING AN OPTICAL ELEMENT

CROSS-REFERENCE TO RELATED APPLICATIONS

This application is a national phase application under 35 U.S.C. § 371 of International Application No. PCT/EP2020/067538 filed 23 Jun. 2020, which claims priority to European Patent Application No. 19305830.2 filed 24 Jun. 2019. The entire contents of each of the above-referenced disclosures is specifically incorporated by reference herein without disclaimer.

TECHNICAL FIELD OF THE INVENTION

The invention relates to the manufacturing of optical components, for example ophthalmic lenses.

More precisely the invention relates to a method for manufacturing an optical element from a curable material using an additive manufacturing technology.

The invention also describes a manufacturing machine for manufacturing an optical element from a curable material using an additive manufacturing technology.

BACKGROUND INFORMATION AND PRIOR ART

The additive manufacturing technologies are suitable for manufacturing many devices, particularly for manufacturing prototype devices within the framework of the development of new technologies as the final obtained device is directly formed with the required shape. However, in the current stage of development, the additive manufacturing technologies are rarely adapted to be used as an industrial tool for mass production of ophthalmic devices.

The additive manufacturing technologies are usually based on a building process layer-by-layer or drop-by-drop. The intended device is thus formed by the overlapping of layers, pseudo layers, or drops.

An example of additive manufacturing technology consists in using a container (or vat) full of liquid curable material and in curing the material layer by layer, in the desired areas, (by lowering at each step the already cured layers so that the surface of curable material can cover these layers and can be cured onto these layers).

Regarding the manufacturing of ophthalmic lenses, especially for eyeglasses, the additive manufacturing technologies are used to produce models of ophthalmic lenses (i.e. prototype). However, these models are rarely adapted to be used in a frame in order to be worn by a wearer. Indeed, an accumulation, within the manufactured optical device, of the interfaces between the layers (or drops and/or the traces of pixels present within the irradiating tools) often forms slight optical defects, and in particular diffracting defects.

These defects appear at the interface between the layers, because the material located on either side of this interface has hardened at different times, which generates local differences in optical properties of the material, leading to diffraction between the layers (it has been noted that the formation of an optical device with a stacking of a multiplicity of layers induces a repetition of a pattern, and such repetitive alternation of optical properties induces the formation of diffracting defects). Moreover, the hardening of the material in a single layer also occurs not uniformly but rather point by point, which also generates diffraction between these points.

These defects are critical when the ophthalmic lens is finally used.

SUMMARY OF THE INVENTION

Therefore one object of the invention is to provide an optic element that does not have defects between layers and that presents the exact desired geometry.

The above objects are achieved according to the invention by providing a method for outputting a manufacturing file for producing an optical element from a curable material by using an additive manufacturing technology, comprising steps of:

acquiring the desired geometry of the optical element, obtaining a discretization of the desired geometry in volume units described by data relative to position parameters of the volume units and to the dimension of the volume units, associating at least a volume unit with a kinetic parameter that relates to the curing pace imposed to the curable material, producing, using at least one processor, a manufacturing file comprising said data and said kinetic parameter for manufacturing at least the optical element, and outputting said manufacturing file.

In other words, the invention describes each volume unit not only by its volume definition (its 3D geometry and its position), but also by at least a kinetic parameter.

Thus, according to the invention, it is possible to predetermine the curing pace of the material during the production of the optical element. For instance, this kinetic parameter enables to cure the skin of the element faster than its core, ensuring the skin to have the desired shape and the material of the core to have enough time to reorganize itself in such a manner that its layers mix with each other (which enables to reduce the optical above-mentioned defects).

According to the disclosure, it is understood that some voxels may be exposed to a number of curing steps greater than 1.

By "curing step", or "step", it is meant irradiation of a voxel, direct or indirect (through other voxels or layers for example) separated of a previous or later step by a time of non-irradiation. In particular, for a given voxel or layer, the first step corresponds to the total irradiations that irradiate directly one or more voxels of a layer, in one or more sub-steps. Further each subsequent step corresponds to the total irradiations that irradiate indirectly one or more voxels of said layer through at least one another layer.

By "total" it is meant that the entire volume of the voxel is irradiated.

By "directly" it is meant that curing energy irradiates a voxel without going through other polymerized or unpolymerized voxels of polymerizable material.

By "indirectly" it is meant that curing energy irradiates a voxel after going through other polymerized or unpolymerized voxels of polymerizable material.

By "irradiations" it is meant the acts of irradiating; to not be confused with "the irradiation" which may correspond to a light dose or a curing surface energy.

By "a voxel may be cured", it is meant the conversion rate or polymerization rate of the polymer material of the voxel reaches a threshold. Unless specifically told otherwise the threshold corresponds to either of a threshold at which the voxel becomes solid.

The wording "curing pace" is defined in the disclosure as the number of steps necessary for the conversion rate or polymerization rate of the polymer material of the voxel to reach a threshold value at which the voxel becomes solid.

Any alternative expression or value that enables to describe the same phenomenon of having polymerization in multiple steps and the polymerization rate by steps, is considered to be an equivalent of the curing pace. Non limiting examples of way to express the curing pace can be a "number H of curing steps necessary to reach solid state", a building delay corresponding to the number of layers needed to be deposited on a anterior layer before the anterior layer reach solid state (if all layers are irradiated by the same curing surface energy), a conversion rate of the polymer after a given number of steps, a sink distance, calculated from the most external layer, at which the material reach the solid state (if all layers are irradiated by the same curing surface energy) . . .

The wording "kinetic parameter" is defined in the disclosure as any parameter that enables to describe or control the curing pace. Its value can describe that the voxel does not reach a solid state after a single step of irradiation. In other words according to the disclosure, the manufacturing file (and the method) has to accept a value of the kinetic parameter that describes a curing pace that is greater than one.

Having a curing pace greater than one means that for at least one voxel, more than one curing step is necessary to have this voxel reach the solid state.

We note that when a layer of voxels is cured in a single step to reach a solid state, a little polymerization rate variation in the layer can be observed. When several layers are successively cured by using the same method, a little polymerization rate variation can be observed in the obtained object. To manufacture such an object, the curing pace is constant and its value is always equal to one, even if some voxels are more polymerized than others. In the instant disclosure, the curing pace can vary and is not equal to one for at least one voxel (we can consider that its value is greater than one for this voxel).

A voxel is considered in a "solid state" when, at ambient temperature, it has a shape that does not vary when it is not subjected to external forces (others than the force of gravity).

The curing pace, or the "curing of a voxel", is more easily expressed if the threshold corresponds to a conversion rate at which the voxel becomes solid. However the disclosure is applicable by using threshold corresponding to greater conversion rate of the polymer material of the voxel, as long as the kinetic parameter associated, in the manufacturing file, is accepted at values for which the voxel which would be manufactured accordingly would not be solid after a step of polymerization.

Other combinable features of the invention are:
for at least one volume unit, said kinetic parameter has a value that imposes the curing of the curable material in at least two curing steps and that imposes that said one volume unit does not reach a solid state after the first of these two curing steps, each curing step comprising the providing of a non-null energy to said one volume unit directly or indirectly through other volume units,
at least one kinetic parameter associated to a first volume unit determines a number H of curing steps needed and necessary so that the first volume unit receive a total curing surface energy that is equal to or higher than a predetermined threshold, said number H being an integer equal to or higher than 1; it is meant that the H curing steps are both necessary and sufficient for the energy received by at least part of the first volume unit to reach said predetermine threshold;
said number H is equal to or higher than 2 and the kinetic parameter implies that the first volume unit receives said curing surface energy through:
a first step of providing a first part of the curing surface energy directly to the first volume unit, said first part being equal to or higher than a curing initiating surface energy, and
at least a second step of providing a second part of the curing surface energy through a second volume unit positioned between the first volume unit and an energy source that emits the curing surface energy;
in other words, part of the energy necessary for the energy received by first part to reach the first threshold is transmitted to a part of the first volume unit by transmission through part of the second volume unit;
the kinetic parameter further comprises a variable related to the curing surface energy to be provided to the first volume unit at each curing step;
the manufacturing file is output so that the kinetic parameters associated to the distinct volume units are different,
said predetermined threshold is determined for the first volume unit by using the Jacob's equation $Ej=Ec \cdot e^{th/Dp}$, with "Ej" a first Jacobs energy from which said energy threshold derives, said energy threshold being equal to or higher than said first Jacobs energy, "th" the thickness of the volume unit considered along the path of the light rays carrying the energy, "Dp" the depth penetration of the curing energy within the curable material along said path, and "Ec" a critical Jacobs energy defined for the curable material; it is to be noted that this means that the predetermined threshold may be different from either Ej or Ec while being determined in relation to Ej;
said predetermined energy threshold is equal to the critical Jacobs energy, or is equal to the first Jacobs energy;
the manufacturing file is output so that the kinetic parameter associated to at least one of the volume units implies that this volume unit receives during a first step a curing surface energy less than the critical Jacobs energy;
a difference in the kinetic parameter associated to two volume units indicates that one of the two volume units needs to be cured faster than the other one;
the optical element is manufactured layer of volume units by layer of volume units;
the kinetic parameter further comprises the curing surface energy to be provided to the first volume unit at each step, or a rule for determining said curing surface energy ;
the kinetic parameter further comprises a variable related to the curing surface energy to be provided to the first volume unit at each step ;
said variable comprises the number of time the volume unit has to receive curing surface energy directly and through each layer positioned in-between the volume unit and an energy source for curing energy;
each volume unit is associated to a target value of received curing surface energy or of polymerization rate to reach before a final global curing step, and said target value varies from at least one volume unit to a second volume unit;

each volume unit is associated with a homogeneity parameter that relates to local curing inhomogeneities in the curable material;

the homogeneity parameter relates to difference between a maximum value and a minimum value of curing surface energy or of polymerization rate when the material reaches said energy threshold in a determined zone;

the homogeneity parameter implies, for at least one value of the homogeneity parameter, the forming of a volume unit in sub-steps of projecting a first pixelated image pattern onto the curable material (i.e. a first discretized pattern formed of several subsets, e.g. pixels or laser hatching), and then projecting another pixelated image pattern onto the curable material so that most of the pixels of this other image pattern overlay at least two pixels of the first projected image pattern;

the optical element being designed to be post-processed, at the acquiring step, the characteristics of the curable material and the type of post-process are acquired, and at the obtaining step, the discretization of the desired shape is done as a function of said characteristics;

the optical element being designed to be post-processed, said target value is determined as a function of the desired geometry of the optical element and as a function of at least one of the following processing parameters: the type of post-process, said post-process being of the subtractive type or of the additive type, the geometry of the volume units, and the reference of the machine used to manufacture the optical element;

the manufacturing file is produced as a function of said processing parameter;

when the post-process is of the subtractive type, each volume unit that intersects a contour deduced from the desired geometry of the optical element is associated to a target value that is equal to or greater than a predetermined threshold;

in other words, when the post-process is of the subtractive type, each volume unit that intersects the sheath (i.e. the desired 3D geometry) of the optical element is considered as part of the optical element;

when the post-process is of the additive type, each volume unit that intersects a contour deduced from the desired geometry of the optical element is associated to a target value that is smaller than a predetermined threshold;

in other words, when the post-process is of the additive type, each volume unit that intersects the sheath of the optical element is considered as not part of the optical element;

the additive manufacturing technology comprises a pixelated pattern printing technology, such as DLP-stereolithography technology or polymer jetting;

the optical element comprises an optical lens.

The invention also deals with a method for outputting a completed manufacturing file for producing an optical element from a curable material by using an additive manufacturing technology, comprising:

acquiring a manufacturing file output according to a method as defined above, running, using at least a processor, an optimization processing loop that processes said manufacturing file by adding and/or removing some volume units and/or by changing some of the data associated to at least one volume unit according to a conflict-managing-rule related to a given manufacturing process, outputting said completed manufacturing file.

The invention also deals with a method for outputting a final machine instruction file, comprising:

receiving a manufacturing file output according to a method as defined above, running a transformation processing loop using a data processor adapted to transform the manufacturing file into data related to values of curing surface energy to be directly applied on the surface of each volume unit, said data being used to generate a completed manufacturing file, outputting said completed machine instruction file and send it to a manufacturing processor of a manufacturing machine able to manufacture an optical element based on said completed manufacturing file.

The invention also deals with a data processor programmed for:

acquiring a manufacturing file output according to a method as defined above, running an optimization processing loop that processes said manufacturing file by adding and/or removing some volume units and/or by changing some of the parameters associated to at least one volume unit according to a conflict-managing-rule related to a given manufacturing process, and outputting a completed manufacturing file.

The invention also deals with a manufacturing machine for manufacturing an optical element from a curable material using an additive manufacturing technology comprising:

a container suitable for containing a curable material, a support suitable for supporting the optical element, a forming system suitable for curing said curable material, and a data processor programmed for:

receiving a manufacturing file output according to a method as defined above, running a transformation processing loop adapted to transform the manufacturing file into data related to values of curing surface energy to be directly applied on the surface of each volume unit, said data being used to generate a completed manufacturing file, manufacturing an optical element based on said completed manufacturing file.

DETAILED DESCRIPTION OF EXAMPLE(S)

The following description with reference to the accompanying drawings, given by way of non-limiting example makes it clear what the invention consists in and how it can be reduced to practice.

Figure 1:
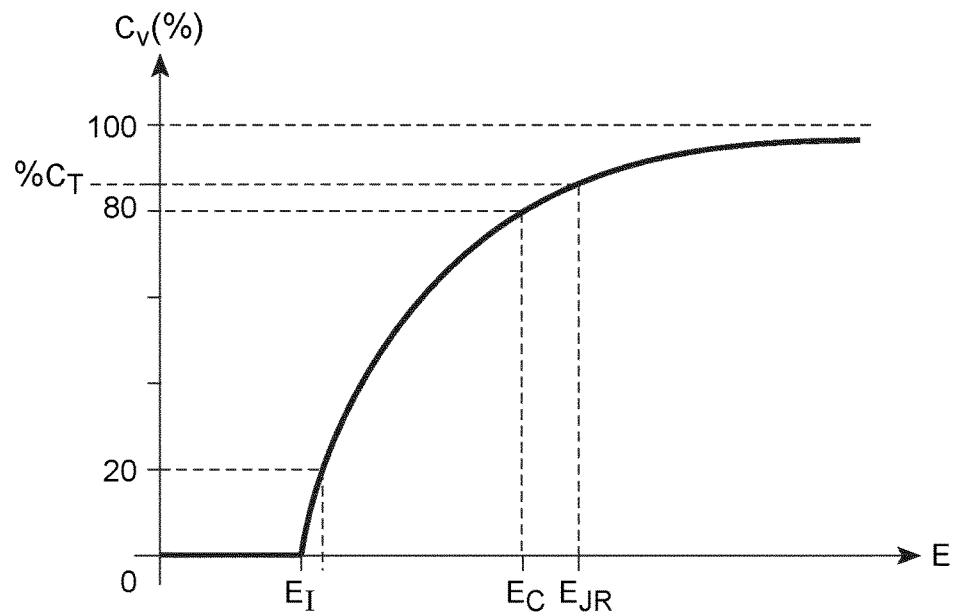
FIG. 1 represents a curve showing the conversion rate of a curable material as a function of the curing surface energy applied onto the surface of this material.

The present invention relates in general to a method adapted to manufacture an optical element using an additive manufacturing technology.

The invention applies more particularly to the manufacturing of all kinds of optical devices and elements, such as ophthalmic elements and devices. Non-limiting examples of ophthalmic elements include corrective and non-corrective lenses, including single vision or multi-vision lenses, which may be either segmented or non-segmented, such as multifocal lenses or progressive lenses, as well as other elements used to correct, protect, or enhance vision, and protective lenses or visors such as found in spectacles, glasses, goggles and helmets. The optical article of the present invention is preferably a lens, and more preferably an ophthalmic lens, for example suitable for being mounted in an eyeglass frame.

The manufacturing by additive technology is done in order to obtain a final shape enabling the lens to be mounted in said eyeglass frame, or to obtain a shape needing a further edging step in order the reach said final shape.

The expression "additive manufacturing technology" refers to a manufacturing technology as defined in the International standard ASTM 2792-12, which mentions a process of joining materials to make objects from 3D model data, usually layer upon layer, as opposed to subtractive manufacturing methodologies, such as traditional machining. Solid objects are thus manufactured by juxtaposing volume elements (mainly layers or voxels, or drops or droplets, or, in some case even blocks of matter). In the case of the present invention, the optical element will be described as being manufactured layer by layer but the invention is not narrowed to such an embodiment.

The additive manufacturing technology may be in practice stereolithography (SLA), digital light processing stereolithography (DLP-SLA) or polymer jetting. Additive manufacturing technologies comprise processes which create objects by juxtaposition of volume elements according to a pre-determined arrangement that can be defined in a CAD (Computer Aided Design) file.

Stereolithography (SLA) and digital light processing stereolithography (DLP-SLA) both work by focusing an ultraviolet light onto a vat of photopolymer liquid resin in order to form solid layers that stack up to create a solid object. Regarding stereolithography (SLA), the liquid resin receives a selective exposure to light by a laser beam scanning the print area. Digital light processing stereolithography (DLP-SLA) uses a digital projector screen to project an image of each layer across the entire surface of the resin. As the projector is a digital screen, the image of each layer is composed of sensibly square pixels, resulting in a layer formed from small rectangular bricks called voxels (volume defined by the square pixel and the thickness of the layer).

As an alternative, the pixels may have other shapes, such as being hexagonal, rhombus or elongated depending on using micro-mirrors or digital screens or other devices to modulate and generate the image of each layer, and on the properties of such device such as micro-mirrors shape, the use of LCD technology or the LED technology for the digital screen . . . etc.

A polymer jetting technology uses an inkjet print head to jet droplets of liquid photopolymer resin onto a build platform. The liquid resin is immediately cured by an ultraviolet lamp and solidified in order to build layers, or the final element, set of droplets by set of droplets (and form the solid object).

The following described embodiments will be illustrated using the digital light processing stereolithography. However the invention is not narrowed to such an embodiment.

In practice here, the additive manufacturing technology used is based on the projection of a light pattern on a curable material. The light pattern is for example an infrared pattern or an ultraviolet pattern. The curable material is for example a photopolymer resin and the optical element is manufactured by a photopolymerization process. As an example, the photopolymer resin comprises (meth)acrylate monomers.

In practice, the photopolymerization process can be characterized by a conversion rate $C_v$ (or polymerization rate) of the curable material. The conversion rate $C_v$ is linked to the physical state of matter of the curable material. Before being irradiated by the curable energy, ie: often irradiation by light, the curable material is liquid. The conversion rate $C_v$ is considered close to 0, not withstanding a slight polymerization due to ageing of the curable material. Under the irradiation of the curable material by the curable surface energy, the curable material polymerizes and switches progressively from a liquid state to a solid state. The curable material is going through multiple states, especially an intermediate state, which corresponding conversion rate Cv depends of the curable material. The intermediate state corresponds to a matter state which is neither liquid nor solid but between them, in particular, not solid enough according to the method according to the methodology of Jacobs, but with monomer having started to polymerize with each other, starting to form parts of a polymer network. The conversion rate $C_v$ of the intermediate state may for example be between 20% and 80% for some acrylate monomers, or higher than 10% and/or lower than 67% for some others. The curable material is considered to be in a solid state for a conversion rate $C_v$ generally higher than 80%. For some acrylate monomers, the curable material is considered to be in a solid state for a conversion rate $C_v$ higher than 67%. Depending on the material, the curable material is considered to be in a solid state for conversion rates higher than a critical conversion rate which may be empirically determined between about 60% to about 80%.

The conversion rates characterizing the intermediate state and the solid state depend on a curing surface energy E (or light dose) derived from the light source, on the absorption properties of the curable material, and on the efficiency of initiator to polymerize the curable material. FIG. 1 represents the conversion rate $C_v$ (in %) as a function of the curing surface energy E which irradiates the curable material in the case of acrylate monomers.

As visible in this Figure, in some case, especially for radical chain growth polymerization, as long as the curing surface energy is lower than an induction surface energy $E_I$ (also named "curing initiating energy"), the conversion rate remains close to 0 (in the presence of an inhibitor). During this period (called the "induction period"), the curable material remains liquid and the polymerization does not occur.

In the case of a radical chain growth polymerization, the reaction between the primary radicals formed by activation of initiators and the monomers is quenched by an inhibitor, here the dioxygen, that reacts preferentially with said radicals thus preventing reacting with monomers. During the induction period, the curing surface energy E received by the curable material is thus used to consume the inhibitor, here dioxygen. When the curing surface energy E received by the curable material reaches the induction surface energy $E_I$, the polymerization process occurs.

When the curing surface energy received by the curable material reaches the induction surface energy $E_I$, the polymerization process is initiated.

It is to be noted that some polymerization processes do not have an induction period, such as some cationic-chain growth polymerization. In such cases, the invention still applies, with the induction surface energy which is negligible.

As long as the total received curing surface energy remains lower than a critical Jacobs energy $E_C$, while the polymerization process progresses and the conversion rate $C_v$ increases (with the conversion of monomers), the curable material remains in the intermediate state but becomes sturdier and sturdier.

The critical Jacobs energy $E_C$ is defined as the minimum surface energy to provide to reach a state solid enough to print a layer with a theoretical thickness of 0. And as the surface energy is linked to matter state, a corresponding conversion rate $C_v$ is paired with the critical Jacobs energy $E_C$ for a given material. In the case of acrylate monomers polymerized by radical chain growth polymerization, the corresponding conversion rate $C_v$ is around 60% to 80%. Above the critical Jacobs energy $E_C$ the curable material, of theoretical thickness of 0, forms a measurable solid part and there is no need to reach a total monomers conversion to get a solid polymerized material, even if an increased conversion may further change the physical and/or optical properties.

The critical Jacobs energy $E_C$ thus is determined using an empirical method based on the Jacobs' equation (Paul F. Jacobs, *Fundamentals of stereolithography* in *International Solid Freeform Fabrication Symposium*, 1992):

th=$D_p$*ln (E/$E_C$), with E the curing surface energy, $E_C$ the critical Jacobs energy, $D_p$ a light depth penetration value of the curing surface energy within the curable material and "th" the polymerized thickness.

The light depth penetration value $D_P$ corresponds to an estimate of the distance which is crossed by the ultraviolet light before being fully absorbed. This light depth penetration $D_P$ is the slope of the "working curve".

The critical Jacobs energy $E_C$ depends on the curable material. It is the intercept of the "working curve". The "working curve" is the semi-logarithmic plot of the measured thickness polymerized vs. the logarithm Ln of the surface energy E.

The experiments set to plot the "working curve" to obtain light depth penetration value $D_P$ and the critical Jacobs energy $E_C$ consists in irradiating a curable material (here a resin) with a set of known curing surface energies and measuring the corresponding polymerized thickness of measurably solid material.

In other words, the Jacobs' experiment is set to determine the critical Jacobs energy. The Jacobs' experiment consists in irradiating a curable material (here a resin) with a set of known curing surface energies and measuring the corresponding polymerized thickness of measurably solid material. The Jacobs' experiment is adapted to determine the critical Jacobs energy $E_C$ and the light depth penetration value $D_P$ using these measurements of polymerized thicknesses (knowing the curing surface energy received by the curable material).

Accordingly, for non-null thicknesses of material, as long as the total received curing surface energy remains lower than the Jacobs energy $E_J$, while the polymerization process progresses and the conversion rate $C_v$ increases (with the conversion of monomers), the layer of curable material is in an intermediate state and becomes harder and harder. Indeed, it is not purely liquid anymore as some chain polymerization has been initiated and it is not solid enough so as to be measured as a solid part according to Jacobs methodology, even if some parts may have locally reached the solid state.

In other words, the Jacobs energy $E_J$ corresponds to the minimum surface energy to provide the expected thickness with a minimum conversion rate empirically determined, for a given curable material, to be enough that the element is solid enough to be measured (and thus to print it). Here, in the case of acrylate monomers, the corresponding conversion rate $C_v$ is usually around 60% to 80%. According to this range for the conversion rate, it is to be noted that there is no need to reach a total monomers conversion to get a solid polymerized material, even if an increased conversion rate may further change the physical and/or optical properties.

The curing surface energy E is an average energy per surface unit (for instance per m²).

To implement the process according to the invention, we may use a system comprising one or more distinct or joined devices.

A first device comprises at least one data processor programmed for acquiring the desired geometry of an optical element, for processing this geometry and outputting a first manufacturing file (the steps of acquiring, processing and outputting will be described later).

A second device comprises at least one data processor (the same or another one) programmed for acquiring this first manufacturing file, for running an optimization processing loop that processes this first manufacturing file, and for outputting a completed second manufacturing file (the steps of running and outputting will be described later).

Figure 2:
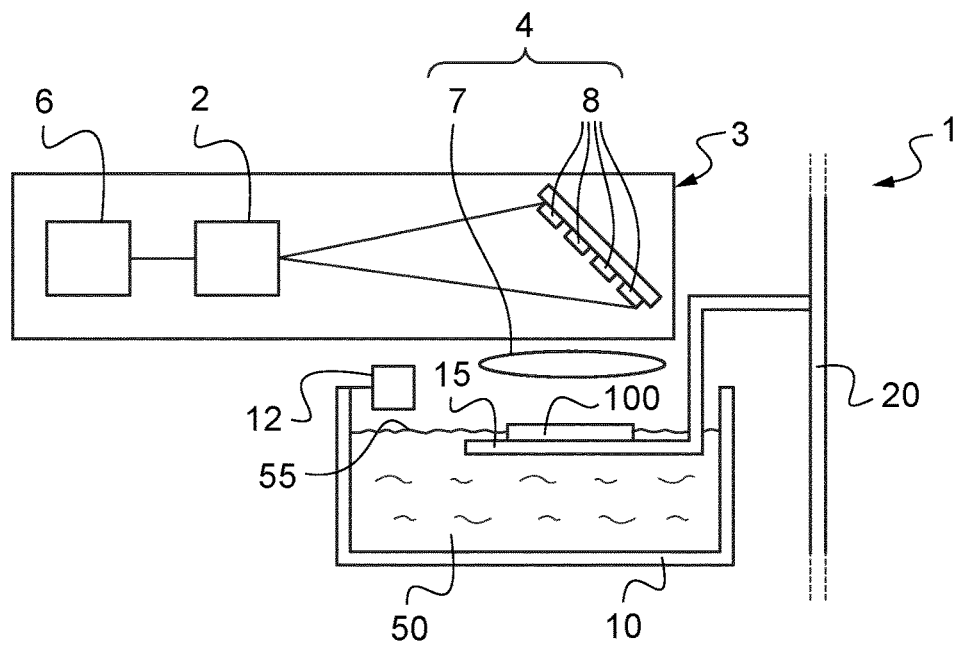
FIG. 2 represents an exemplary manufacturing machine adapted to manufacture an optical element according to the invention.

A third device is a manufacturing machine 1 as shown in FIG. 2, that is adapted to manufacture an optical element by additive manufacturing, such as by way of a DLP-SLA process. The manufacturing machine comprises a forming system 3, a container 10, a support 15 and at least one actuator 20.

The forming system 3 comprises an energy source 2, an imager 4 (a special light modulator), and a computer 6. The forming system 3 is adapted to implement a method for manufacturing an optical element 100 as described below when the instructions are executed.

In practice, the computer 6 includes at least one microprocessor and a memory (not represented). The microprocessor is adapted to execute the instructions deriving from said completed manufacturing file in order to manufacture the optical element 100 and the memory stores these instructions. As an example, the computer 6 (that is distinct or not from said at least one data processor) is programmed to generate instructions regarding the magnitude of the curing surface energy E and regarding an image pattern to be projected on the surface 55 of the curable material 50. These instructions are for example transmitted to the energy source 2 and to the imager 4.

The energy source 2 is suitable for irradiating the surface 55 of the curable material 50 with a curing surface energy E.

The energy source 2 provides a light beam, for example, an ultraviolet light, directed to the curable material 50 by the imager 4.

The imager 4 is adapted to project the light coming from the energy source 2 onto the surface 55 of the curable material 50 to form said image pattern. The imager 4 comprises a plurality of micro-mirrors 8 arranged into a grid format.

It is to be noted that other alternative combination of energy source and imager exist. For example, the formation of the image pattern may be generated entirely by the energy source, using micro-mirrors or a digital screen, using LCD or LED pixels for example, and the imager only provides positioning and focusing effects; alternatively, the energy source may provide energy in a continuous or regular burst manner, and the imager generates the image pattern on top of positioning and focusing effect.

In practice, the micro-mirrors 8 are separated from each other by an interspace (indeed, it is not possible to have a perfect junction between two adjacent micro-mirrors); digital screens using LCD or LED pixels also bear such interspaces.

A micro-mirror 8 is for example in a sensibly square-shape, with a size of for example 8×8 $\mu m^2$. The interspace is comprised between 1 and 10 μm, for example around 2.8 μm, for a pitch between micro-mirrors of about 10.8 μm. Once projected onto the surface 55 of the curable material 50, the micro-mirrors may form projected pixels with a given pitch, comprising a direct projection of the micro-mirrors and of the interspace, for example the pitch may be of about 40×40 μm, with about 30×30 μm corresponding to a projection of the micro-mirrors, separated by an interspace of about 10 μm.

When the micro-mirrors 8 are illuminated by the light beam, they either reflect the light toward the surface 55 of the curable material 50 with a light intensity or do not reflect the light toward said surface 55 depending on an individual control of each micro-mirror. Consequently, the micro-mirrors 8 are adapted to draw a pattern on the surface 55 of the curable material 50, which pattern is pixelated (each pixel corresponds to a micro-mirror). Because the micro-mirrors 8 are separated from each other by an interspace, the projected pattern on the surface of the curable material 50 thus comprises some shadowed areas. Thus, the pixels on this projected pattern are separated from each other by an interpixel space. The material situated under these interpixel spaces is less polymerized than the other part of the material. In some cases it can even be under-polymerized or not polymerized.

The repetition of such regular variation of the polymerisation rate within a same layer, due to the presence of the underpolymerized shadowed areas, and the succession of layers leads to the formation of observable diffraction defects. Such defects are incompatible with the expected optical quality of spectacle lenses.

Indeed, the inventors have noted that even in cases where the curable surface energy is very high, and that the shadowed area receive enough surface energy to become solid in the meaning of Jacobs during the irradiation of single projection of an image pattern, but less than in the other areas, or receive such energy in a post-curing step, the polymerisation rate, and/or pace, of the shadowed area is different than in the area corresponding to the projection of the micro-mirrors, leading to the formation of observable diffracting defects.

In this specification, we will consider that the projected pattern is composed of square pixels, resulting in a layer formed from small rectangular bricks called voxels (volume defined by the square pixel and the thickness of the layer).

As visible in FIG. 2, the imager 4 comprises a projection system 7 (here a lens) adapted to direct the ultraviolet beam from the plurality of micro-mirrors 8 to the surface 55 of the curable material 50. Further, the size of the micro-mirrors or LCD or LED pixels or of the projected pixels may vary from the current example without disparaging from the invention.

The curable material 50 is stored in the container 10 in a liquid state. Once polymerized, the curable material 50 forms the optical element 100 which is born by the support 15. In practice, the support 15 is partly immersed in the curable material 50 such that a portion of the liquid curable material 50 is on the top of the support 15. The light beam provided by the energy source 2 is thus projected on this portion of the curable material 50. When this portion is polymerized, the part of the optical element which is formed is thus on the support 15.

The manufacturing machine 1 also comprises said at least one actuator 20. The at least one actuator 20 is suitable for shifting the support 15 on which the optical element 100 is formed. This at least one actuator 20 allows a vertical movement of the support 15, along an axis sensibly orthogonal to the surface 55 of the curable material 20. This vertical movement of the support 15 allows controlling the thickness of liquid curable material 50 to polymerize. The at least one actuator 20 thus allows controlling the thickness of the polymerized layer.

The at least one actuator 20 also allows a horizontal movement, along an axis sensibly parallel to the surface 55 of the curable material 50.

As represented in FIG. 2, the manufacturing machine 1 comprises here a recoater device 12. This recoater device 12 is for example suitable for spreading some curable material on the top of a previous layer of curable material. Alternative method do not use a recoater and may position a membrane on the surface of curable material to achieve flatness of the material and controlling the thickness of curable material added on top of an previous layer of curable material.

As explained here above, the manufacturing machine 1 is programmed for producing an optical element 100 from a curable material 50 by using an additive manufacturing process.

This optical element 100 advantageously comprises an ophthalmic lens. It may be composed of only this ophthalmic lens. In a variant, it may comprise both an ophthalmic lens and a stabilizer that immobilize the lens on the support 15. Indeed, it is to be noted that the stabilizer may comprise support beams formed by cured curable material.

To sum up, the production process of this optical element 100 comprises a multiplicity of curing steps for curing the curable material 50 layer by layer, inside sliced contours, by applying a curing surface energy E onto the surface 55 of the curable material 50 that varies from a zone to another and from a layer to another.

To this end, each layer is irradiated one after the other, the support being submerged between two irradiations of a depth equal to the layer thickness and the recoater device 12 spreading some curable material 50 on the top of the last formed layer. (As explained above, other technical solutions can be contemplated, for instance the use of a membrane).

The goal is to manufacture the optical element 100 without curing too fast the curable material 50 in order to let it enough time to reorganize itself in such a manner that the layers mix with each other (which reduces the optical defects in the lens).

This strategy consists in providing the material with energy without reaching the critical Jacobs energy Ec for as long as possible to let monomer chains migrate and grow between pixel regions and in particular between two subsequent layers. In other words, the material is not cured to a solid state in one exposure but by several exposures spread out in different consecutive layers. In such embodiment it is ensured that the light is able to penetrate in the material further than the thickness of just one layer.

When a new layer is put on a first layer that is not polymerized to a solid state, the risk is that this first layer deforms due to lack of mechanical strength in response to external mechanical stress. Such damages may specifically appear when the layers are moved relative to the surrounding material or relative to structural elements present near the layers, for example when further layers are introduced.

Figure 3A:
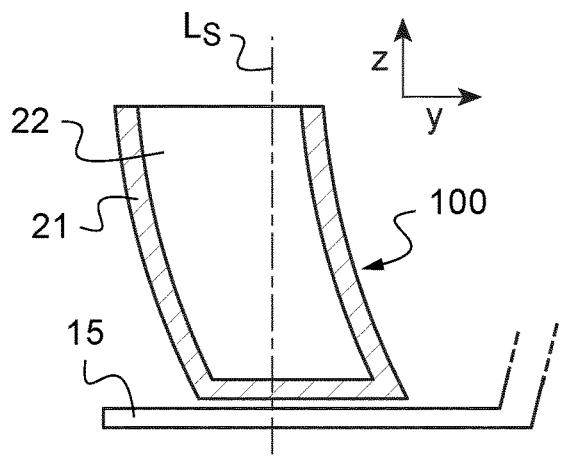
FIG. 3A represents a side view of a part of an optical element to be manufactured according to the invention.
Figure 3B:
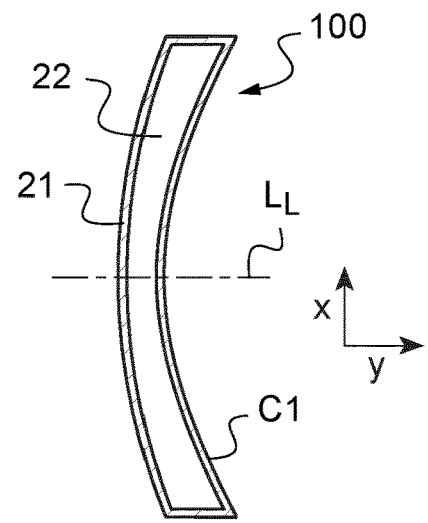
FIG. 3B represents a top view of the part of the optical element represented in FIG. 3A.

According to one embodiment, which helps to manage this risk, at least some layers are cured so that the contour of the cured zone (named the skin 21 of the optical element as shown in FIGS. 3A and 3B) is cured rapidly (in one or two exposures) to ensure the edges of the optical element 100 are rigid enough to ensure that the irradiated parts of the layer resist to the applied external mechanical stress.

In an application of such embodiment, most of the layers are manufactured thanks to a "skin/core strategy". In particular within a layer the skin 21 is cured so as to be in the solid state, ie: receive more than the Jacobs energy before irradiating a further overlapping layer. Further the core 22 (the zone situated inside this skin 21) is cured so as to reach the Jacobs energy in several irradiations received directly and indirectly (through other layers situated onto this layer). It can thus be considered that the skin is polymerized more quickly than the core.

Further, as explained above, the pixels projected on the surface 55 of the curable material 50 by the micro-mirrors 8 are separated from each other by interpixel spaces (the "shadow areas"). Consequently, after being directly irradiated, a layer comprises an alternating of irradiated zones and of less irradiated (and less polymerized) zones.

It is to be noted that for the purpose of illustration, within the whole specification, the mechanism will be simplified and it will be considered that the shadowed areas corresponding to the projection of the interpixel space for a given image pattern are not irradiated and do not polymerize during the irradiation linked to said image pattern. However the invention is not bound by this illustration and the example described using this simplified mechanism apply mutatis mutandis to more complex cases where the shadowed areas receive curable surface energy and where thus the corresponding curable material may polymerise. In those cases it is still to be noted that the shadowed area comprises some material that is not as well polymerized as under the direct projection of the micro-mirrors or LCD or LED pixels.

A solution consists in polymerizing, or further polymerize, these shadow areas later, during another irradiation of the considered layer or preferably during the irradiation of one or several other layers placed on the considered layer. These irradiations will be performed in such a manner to reduce the amplitude of the differences in polymerization rate and/or pace. This will further ensure a reduction of the amplitude of the difference in polymerization and of optical properties for the end product.

Now it is clear how the curing steps will be operated, we can describe in detail how the first manufacturing file can be generated.

The first step consists in acquiring the desired 3D geometry C0 of the optical element 100.

To this end, the at least one data processor receives from another machine this 3D geometry C0 in the form of a 3D file (for instance in the form of a 3D CAD file). Alternatively, a user may create or calculate the 3D geometry using the data processor.

During this first step, the data processor may acquire other input data that are:

- the type of post-process (subtractive or additive) to apply to the optical element 100,
- finishing parameters relative for instance to the width of the skin 21 and to the possible presence of other areas to be cured,
- curable material behavior (e.g. polymerization rate Cv to reach so that the material changes its state from liquid to intermediate and to solid).

The second step consists in obtaining a discretization of this desired geometry C0 in volume units $U_i$ described by data relative to position parameters of the volume units and to the dimension of the volume units $U_i$.

To this end, because the considered manufacturing machine 1 is a DLP-SLA device, this 3D desired geometry C0 is sliced into several layers of predetermined thickness, and each layer is divided in voxels whose upper face correspond to one of the pixels generated by the micromirrors 8. It is to be noted that in a variant, the layers may have different thickness values.

The data processor may access different information in order to calculate the discretization, such as:

- process parameters to define voxel sizes (or laser spot diameter in case of a SLA system),
- homogenization model through pixel grid movements (e.g. a definition of set of pixels according to which the pattern to print on the surface of the curable material have to be shifted in order to irradiate the shadowed areas).

In other words, in this embodiment, each volume unit corresponds to a voxel $U_i$ whose dimensions are known.

As shown in FIGS. 3A and 3B, here, the layers are superimposed along an axis $L_S$ roughly orthogonal to an optical axis $L_L$ of this ophthalmic lens (this optical axis $L_L$ being for instance, in the case of a monofocal lens, an axis along which the light is not deviated when it passes through the lens). As an alternative, the axis $L_S$ of superimposition is tilted from more than 45 degrees relative to this optical axis $L_L$.

It is to be noted that, in a non-illustrated example, the invention also apply when the axis $L_S$ of superimposition is tilted from less than 45 degrees relative to this optical axis $L_L$, for example when the axis $L_S$ of superimposition is sensibly superimposed to the optical axis $L_L$.

In additive manufacturing, it is commonly accepted that the axis Z is the printing direction (corresponding to the axis $L_S$) and the axes X and Y define a building plane parallel to the surface of liquid curable material in the vat, often corresponding to a plan parallel to the support 15.

Here, the position of each voxel $U_i$ of the optical element 100 is identified by three values x, y, z.

The illustrated optical device is planned to be manufactured while having a "core-skin" structure as presented above.

If there is no problem for determining if a voxel of the core 22 belongs to the optical element 100 or not, this is more difficult for the voxels of the skin 21 that are situated on the boundary of the optical element 100.

To explain this problem and the solution to this problem, the intersection between a plane of each layer and the external 3D desired contour C0 of the optical element 100 must be contemplated. This intersection defines a sliced contour C1 that extends in a two dimensional plane. It is to be noted that the sliced contour C1 corresponds to an outline of the solid part of the device to be manufactured, for example the optical element 100.

It is to be noted that in most embodiments the slicing mentioned with regard to the sliced contours corresponds to the slicing into the layers for the manufacturing step.

We can also contemplate the intersection between the layer (whose thickness is not null) and the external 3D desired contour C0 of the optical element 100. This intersection defines a three dimensional contour $C1_{3D}$.

Figure 4:
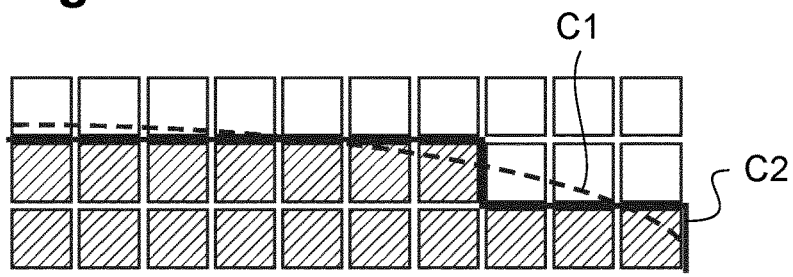
FIG. 4 represents a plane view of a sliced contour of the optical element and of the pixels generated by the manufacturing machine on the curable material.

A shown in FIG. 4, because the projected pattern on the curable material 50 is pixelated, the pixelated projected image cannot perfectly follow the sliced contour C1 or $C1_{3D}$.

Consequently, a rule depending of the shape of the sliced contour C1 or $C1_{3D}$ and of the external contour of the projected pixels has to be determined in order to affect to each pixel a suitable curing surface energy E.

To understand this rule, we can define a "pixelated contour C2" as being the external contour of the pixels of the skin 21. In case the optical element contains holes, the contour can be composed of several contours that can be either external or internal.

As shown in FIG. 4, a first rule could be to switch ON a pixel when the major part of this pixel is situated inside the sliced contour C1 and to switch OFF a pixel when a minor part of this pixel is situated inside the sliced contour C1 or when it is situated outside the sliced contour C1.

Here, both the sliced contour C1 and the pixelated contour C2 are defined in two dimensions (in a plane orthogonal to the axis $L_S$). In a variant, we may consider the contour $C1_{3D}$ and apply another rule according to which the pixels switched ON are those associated to the voxels whose a major part of the volume is situated inside the contour $C1_{3D}$.

As shown in FIG. 4, these two simple rules will create both lacunas and excess of material on the surface of the optical element 100.

Accordingly, the disclosure presents an embodiment of another possible rule. This other rule consists in determining a first set of voxels to be quickly polymerized (ie the voxels of the skin 21 of the considered layer) as a function of:
  the geometry of the sliced contour C1 or $C1_{3D}$, and
  the type of post-processing process, said post-processing process being of the subtractive type or of the additive type, and/or
  the geometry of the voxels, and/or
  the reference of the machine used to manufacture the optical volume element 100 (this reference being able to be used to determine the geometry of the voxels and the dimensions of the interpixel spaces).

In a first embodiment of said rule, we can consider the situation in which the optical element 100 is designed to be post-processed thanks to a finishing process of the subtractive type.

In this situation, because the optical element 100 will be machined (surfaced, polished . . . ), the optical element 100 is designed so as to have an excess of material after additive manufacturing with regard to the desired geometry of the optical element.

Figure 5A:
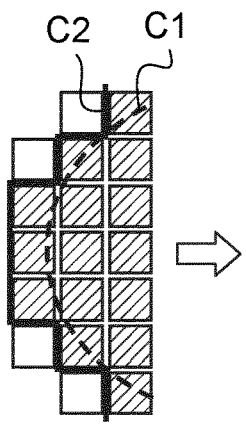
FIGS. 5A to 5C represent three steps of manufacturing an optical element when the post-processing process is of the subtractive type.

To this end, as shown in FIG. 5A, the pixelated contour C2 is determined in such a manner that it is situated outside (or on) the sliced contour C1 (the nearest to it). In other words, the rule consists in switching ON a pixel as long as the sliced contour C1 passes through it. In this embodiment further predetermined pixels outside the sliced contour C1 may also be switched ON so as to form a contour C2 including an extra-thickness around the contour C1 (or $C1_{3D}$). Alternatively, the contour C0 to be manufactured may be a contour comprising a predetermined, non necessarily uniform, extra-thickness versus the final optical device that is design to be manufactured based on the optical element. Such extra thickness may already be present when acquiring the 3D geometry C0 in the form of a 3D file. Alternatively, said extra-thickness may be added to the 3D geometry C0 by the at least one data processor, manually controlled by a user or automatically based on the chosen post process.

Figure 5B:
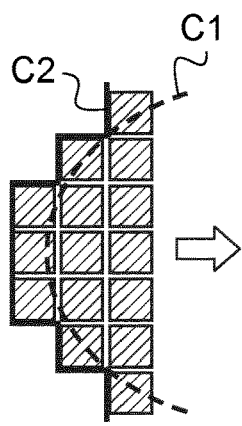
Figure 5C:
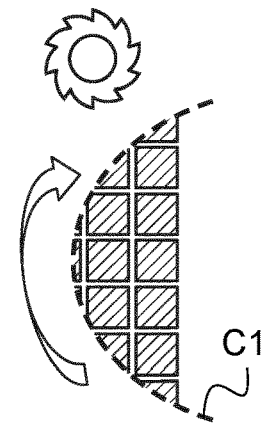

When all the curing steps are achieved (see FIG. 5B), the sliced contour C1 is situated inside the contour C2 formed by the polymerized voxels. Hence, thanks to this method, when the optical element 100 is machined so as to reach the sliced contour C1, no lack of material appears within the surface of this element (see FIG. 5C).

This first embodiment has been illustrated using the two dimensional sliced contour C1. In a variant, the three dimensional contour $C1_{3D}$ can been considered. Using the 2D sliced contour C1 is easier for computational reasons but is less accurate than using the three dimensional contour $C1_{3D}$.

A risk of working with the two dimensional sliced contours C1 is that, for at least one layer, the plane used to determine the sliced contour C1 may show for at least one vowel a lack of matter, thus no need to switch ON the corresponding pixel, whereas there exists at least one another plane, parallel to said plane used to determine the sliced contour C1, for which said at least one voxel would have shown the presence of matter, thus implying the need to switch ON the corresponding pixel. Thus lacunas may be revealed during the subtractive manufacturing step when no 2D sliced contour passes through a pixel but the associated contour $C1_{3D}$ passes through the corresponding voxel. In this particular case, considering the sliced contour C1 or the contour $C1_{3D}$ would lead to two different results.

To prevent this, it is possible to determine the contour C2 based on the contour $C1_{3D}$. Alternatively, another solution is proposed, which considers the 2D sliced contour C1 not in the slicing plane, but on using both the planes corresponding to top and bottom faces of the layer, or voxel, or directly the top and bottom faces of the layer or voxel, in order to check that the sliced contour C1 is positioned in the same way on these two faces.

Another solution consists in distinguishing an "upskin case" and a "downskin case" for voxels near the surface of the 3D contour C0. Both cases may used be within one layer, some voxels corresponding to upskin cases and some other corresponding to downskin cases.

Figure 7:
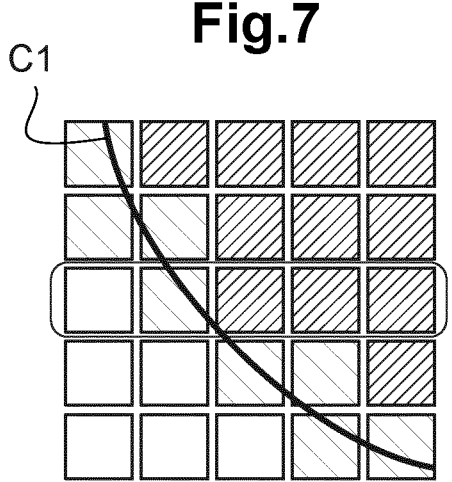
FIG. 7 is a view similar to that of FIG. 4, in a bottom part of the optical element.

The "upskin case" corresponds to the situation of FIG. 7 where the voxels to be polymerized are situated above the sliced contour C1, with regard to a direction of stacking layers of material (ie the voxels to be polymerized are situated on the side of the energy source relative to the sliced contour C1). In this case, the reference faces of the voxels may be the bottom faces (in other words, the sliced contour C1 to be considered in order to determine if a voxel has to be polymerized is the one that extends on the bottom faces of the voxels). By bottom face, it is meant the face of the layer (or voxel) farther from the energy source.

Figure 8:
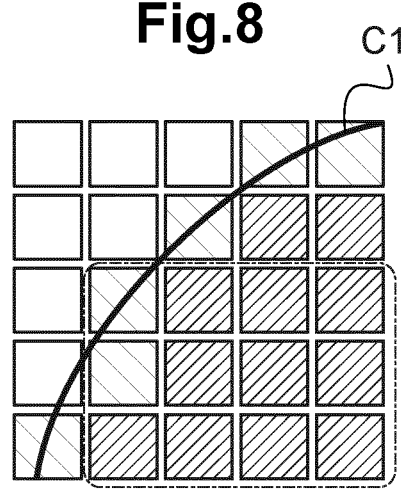
FIG. 8 is a view similar to that of FIG. 4, in an upper part of the optical element.

The "downskin case" corresponds to the situation of FIG. 8 where the voxels to be polymerized are situated under the sliced contour, with regard to the direction of stacking layers of material (ie the voxels to be polymerized and the energy source are situated on both sides of the sliced contour C1). In this case, the reference faces of the voxels may be the top faces (in other words, the sliced contour C1 to be considered is the one that extends on the top faces of the voxels). By top face, it is meant the face of the layer (or voxel) closer from the energy source.

In a second embodiment, we can consider the situation in which the optical element 100 is designed to be post-processed thanks to a finishing process of the additive type. Such finishing process of the additive type may comprise a step of depositing a coating, either by inkjet printing, dip coating, spin coating, spray coating, press coating using a shaping membrane . . . etc In this situation, because the optical element 100 will be coated, in order to respect the geometry of the device to manufacture, it is preferable to have lacunas rather than excess of material on the surface of the optical element 100.

Figure 6A:
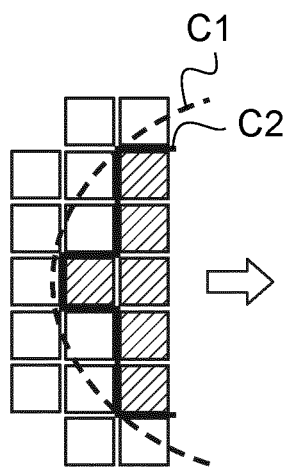
FIGS. 6A to 6C represent three steps of manufacturing an optical element when the post-processing process is of the additive type.

To this end, as shown in FIG. 6A, the pixelated contour C2 is positioned in such a manner that it is situated inside (or on) the sliced contour C1 (the nearest to it). In other words, the rule may then consist in switching OFF a pixel when the sliced contour C1 passes through it.

Figure 6B:
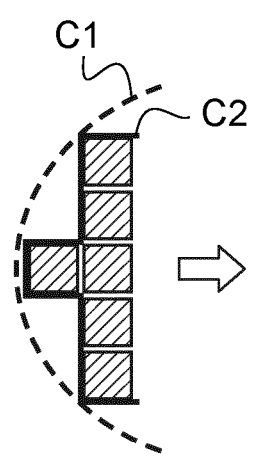
Figure 6C:
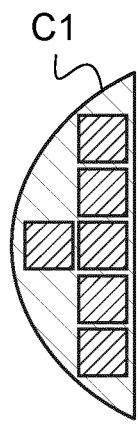

When all the curing steps are achieved (see FIG. 6B), the sliced contour C1 is situated inside the polymerized voxels. Hence, thanks to this method, no machining of the optical element 100 is needed before coating it (see FIG. 6C).

In this second embodiment, the two dimensional sliced contour C1 has been considered. In a variant, the three dimensional contour $C1_{3D}$ can been considered. In another variant, it is also possible to use the "upskin case" and "downskin case".

In this circumstance, the "upskin case" corresponds to the situation of FIG. 8 where the voxels to be polymerized are situated above the sliced contour. In this case, the reference faces of the voxels are the top faces (in other words, the sliced contour C1 to be considered in order to determine if a voxel has to be polymerized is the one that extends on the top faces of the voxels). By top face, it is meant the face of the layer (or voxel) closer from the energy source.

The "downskin case" corresponds to the situation of FIG. 7 where the voxels to be polymerized are situated under the sliced contour. In this case, the reference faces of the voxels are the bottom faces (in other words, the sliced contour C1 to be considered is the one that extends on the bottom faces of the voxels). By bottom face, it is meant the face of the layer (or voxel) farther from the energy source.

The above mentioned rules enable the positioning of the external boundary of the skin 21. The remainder of the skin 21 may be defined thanks to another rule consisting in considering a predetermined width for the skin 21. Preferably, this width is substantially equal to W voxels, W being equal to or lower than 10 (even 5) voxels. For instance, it can be equal to 3 pixels. Depending on the cases, the width may be considered within the plane of the contour C1 or within a tilted plane (for instance a plane that orthogonal to the tangent to the contour C1) in order to contemplate the distance of a voxel to the surface of the 3D geometry C0. Accordingly, in this second case, some voxels situated farther than W voxels from the contour of the contour C1 may be part of the skin as long as some voxels of a layer W layers above or below the considered voxel are outside the contour C2 of their respective layer.

More generally, the width of the skin needs to be enough to anchor the skin area of a layer to the skin areas of a previously formed layer, and provide enough mechanical resistance to maintain the shape of the formed layer.

In other words, this width is chosen to be thick enough to support the mechanical stresses applied during the manufacturing process, for example by use of a recoater, and thin enough to generate only negligible visual defects in the optical element 100.

At this step, we may consider that the positions of the voxels Ui of the skin 21 are well defined. We may also consider that the voxels situated inside the skin are those of the core 22 and that their positions are also well defined.

It is to be noted that in the case of subtractive post processing, the sliced contour C1 may have a shape that would induce an extra thickness or positive offset with regard to the device to manufacture. It is further to be noted that in the case of additive post processing, the sliced contour may have a shape that would induce locally a negative offset with regard to the device to manufacture.

Said offset, positive or negative, their corresponding relative thickness and/or repartition and/or uniformity along the device depends on the type of post process and/or machine that would be applied. Accordingly, the sliced contour C1 includes any offset related to the post process.

Thus, at this stage, each voxel $U_i$ to be polymerized is known, identified by its position data x, y, z and has predetermined and identified dimensions.

These data can be memorized in a manufacturing file, said file being able to be processed in order to manufacture the optical element.

These data give a description of the part to be printed in order to reach the desired geometry C0. But they don't take into account other important properties for the manufacturing of the optical element 100 (polymerization pace strategy, strategy for managing interpixel spaces, skin/core strategy).

According to the invention, these strategies are implemented through adjusting the intensity and the pace of the curing surface energy E applied on the surface 55 of each voxel or area of each successive layer of the curable material 50.

To these end, within the manufacturing file, each voxel $U_i$ is associated with at least one other parameter enabling to predetermine how the manufacturing machine is to polymerize the optical element 100. Here, in an example of this embodiment, each voxel $U_i$ is associated with three other parameters that are:
- a kinetic parameter that relates to the curing pace imposed to the curable material 50,
- an homogeneity parameter $\Delta C$ that relates to local curing inhomogeneities in the curable material 50, and
- a target value of curing surface energy E or of polymerization rate Cv to reach (before the final global curing step, which final step will be described after), this parameter being here expressed as a target polymerization rate % $C_T$.

According to the embodiment, in some manufacturing files, the voxels may be associated with one, two or three of the above other parameters, and more preferably with at least the kinetic parameter and/or the homogeneity parameter.

As explained above, in the current embodiment, each voxel $U_i$ is associated with a kinetic parameter that relates to the curing pace imposed to the curable material 50 of the voxel.

This parameter enables to define if a predetermined state of matter or energy threshold or conversion rate, is to be reached in one or more distinct irradiation steps; and if necessary in how many such distinct irradiations steps. In particular it may define a number of layers needing to be irradiated for the energy provided to a given voxel to reach a predetermined threshold energy T1. Such number of layer has the layer of the given voxel as a starting point, either as being the layer numbered zero or numbered one.

Accordingly, the kinetic parameter may be controlled through a predetermined threshold and an adjustable number of layer or with a predetermined number of layers and a threshold energy adjustable for each voxel, or by adjusting both parameters. In other words the kinetic parameter may be controlled by adjusting either or both of the threshold energy value and the number of layer.

In other words, this kinetic parameter can be expressed through a variety of ways and it may be composed of one or more than one sub-parameter.

Different areas or voxels may have kinetic parameters implying different number of steps and/or different threshold energy T1.

For an optical device having a core area where optical homogeneity is sought in particular between layers, for at least one voxel, and preferably most or all voxels of the core area within a given layer, the threshold is preferably Ec, and the kinetic parameter is preferably such that Ec is reached after at least 3 different irradiations, preferably at least two of those irradiations being applied to layers different from the given layer. This means that the curing is slow enough so as to let the polymer network interpenetrate between subsequent layers.

For an optical device having a skin area, for which geometrical accuracy and/or mechanical strength is sought, for at least one voxel, and preferably most or all voxels of the skin within a given layer, the threshold is preferably equal or higher than $E_J$ and the kinetic parameter is preferably such that $E_J$ is reached through the irradiation of two or less layers, preferably $E_J$ is reached after direct irradiation of the given layer. This means that the skin is thus rapidly cured to a hard state which ensures mechanical strength of the skin.

In an embodiment, the kinetic parameter may thus comprise a number H of curing steps of different layers needed and necessary for the voxel $U_i$ to receive the threshold energy T1 (each of the H curing steps providing a non-null energy to this voxel).

Consequently, for some voxels, corresponding here to voxels of the core 22, the kinetic parameter implies that each of these voxels receives the curing surface energy E sufficient to reach the threshold energy T1 through:
  a first step of providing a first part of the curing surface energy E directly to the considered voxel $U_1$, said first part being equal to or higher than the induction surface energy $E_I$ and lower than the critical Jacobs energy Ec, and
  at least a second step of providing a second part of the curing surface energy E indirectly, by transmission through a second voxel $U_2$ or second set of voxels if the pixel grid is moved between the two subsequent layers, positioned between the first voxel $U_1$ and the energy source 2.

Hence, within the manufacturing file, a difference of number H between two voxels having a same threshold value indicates that one of the voxels needs to be cured faster than the other one, and receive more energy at each irradiation of a given layer.

Figure 10:
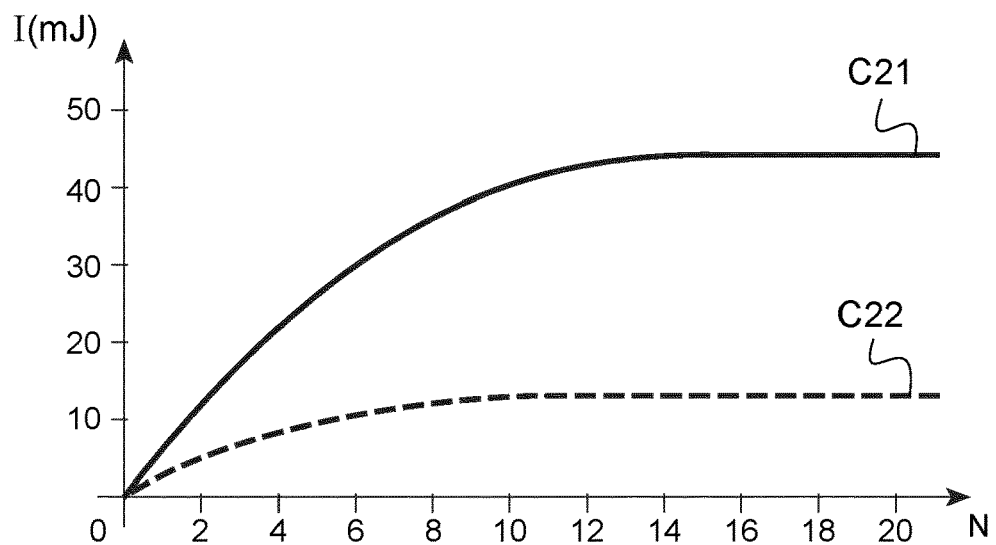
FIG. 10 represents a curve showing the intensity of the curing energy received by a voxel of curable material as a function of the number of irradiations when a new layer is put on this voxel after each irradiation.

To show this difference, we may refer to FIG. 10. In this figure is represented the variation of energy I (light dose) received by a voxel through a number N of exposures, considering that each layer receives only one direct irradiation and each irradiation is done with the same energy per voxel of its corresponding layer.

This example corresponds to voxels of curable material manufactured according to the manufacturing file having:
  for curve C22, the kinetic parameter H equal to 3 and the threshold T1 equal to EJ, and
  for curve C21, the kinetic parameter H equal to 1 and the threshold T1 equal to EJ.

The illustrative curable material has a depth penetration Dp of about 70 μm, corresponding to about 7 layers of 10 μm, and a critical Jacobs energy of about 7 mJ, with a Jacobs energy for layers of 10 μm of about 7.56 mJ.

The curing surface energy E applied at each step on the material of a first voxel, here belonging to the skin 21 (curve C21), is higher than the one applied on the material of a second voxel, here belonging to the core 22 (curve C22).

Further, it is noted that within the curve C21 the Jacobs energy is exceeded since for the topmost layer, numbered 1 on the N axis, one irradiation is sufficient to reach EJ.

Similarly, it is noted that within the curve C22 the Jacobs energy is exceeded only for layers numbered greater or equal to 3, thus 3 irradiations, with 2 irradiations through other layers, are needed for the voxels following curve C22 to reach EJ.

These curves C21, C22 show that in the current example the received light dose does not vary sensibly after 14 layers. These curves also show that the energy I received per subsequent irradiation is attenuated with the number of layer separating the given layer and the light source at each irradiation.

In a variant, the kinetic parameter may be expressed as a polymerization rate Cv at a predetermined sink distance (said sink distance corresponding to a thickness of curable material, in a solid, liquid or intermediate state separating the considered voxel from the surface of curable material, for example expressed as a number of layers).

In a variant, the kinetic parameter may further comprise a variable related to the curing surface energy Ei to be provided to the considered voxel $U_i$ at each irradiation for the H steps defined earlier.

In an embodiment, using any variant above-described, in the manufacturing file, each voxel may be assigned one part of the kinetic parameter, for example the value H, or respectively the polymerization rate, and the other part of the parameter, ie: the surface energy threshold T1, respectively the sink distance, may be predetermined collectively for all voxels of the device, or vice-versa. In alternative embodiments, either or both parts of the kintetic parameter may be determined collectively by areas of the device, or may be assigned individually to the voxels. The different embodiment may be combined partially or globally.

To sum up, thanks to this kinetic parameter, it is possible to differentiate, predetermine and control, within the manufacturing file, that the polymerization for some voxels, for example in a core area 22, will raise slowly for ensuring optical homogeneity and the solid state will only be reached after several exposures (several build layers), and that on the contrary, for other voxel, for example in a skin area, the solid state will be reached in only one or two exposures.

In the particular illustrative example, it is thus possible to predetermine, within the conception phase of the manufacturing file, skin and core areas, the skin areas reaching quickly a solid state to ensure that the contour is respected, and the core areas entering a solid state only after more layers are built so as to ensure homogeneity between layers.

It is to be noted that due to interspaces between pixels and light absorption, the light dose received inside the voxel is not even. The abovementioned parameters of the kinetic parameter may thus be set considering a mean value inside the voxel or a max value inside the voxel. In one embodiment the max value is considered so as to control that the polymerization does not increase too rapidly in any point of the voxel.

As explained above, the inhomogeneity within the cured material resulting from the interspaces and shadowed areas may be limited. Indeed, one may use for example the above-mentioned strategy consisting in shifting the pixelated image patterns projected onto the curable material 50 between at least two successive irradiations, either on a same layer or on two or more different layers.

In practice, this strategy comprises sub-steps of:
projecting a first pixelated image pattern onto the curable material 50, and then
projecting another pixelated image pattern onto the curable material 50 so that most of the pixels of this image pattern overlay at least two pixels of the previously projected image pattern.

In an embodiment the pixelated image pattern is shifted each time a new layer is deposited on a previously formed layer. In addition or in a variant, the irradiation of each layer is done in multiple sub-steps, and pixilated image patterns are shifted between two direct sub-steps irradiations of the same layer.

Whatever the used method, the inhomogeneity can be constrained. Thus, according to an embodiment of the disclosure, the manufacturing file may provide for each voxel or area of the layer or volume a parameter to define a level of homogeneity requirement such as the above mentioned homogeneity parameter $\Delta C$.

In an embodiment, this homogeneity parameter $\Delta C$ defines a maximum variation in material state that the curable material 50 allows in a predetermined zone of a layer after the material has reached the critical Jacobs energy Ec. Indeed, that is the point at which the material is considered solid and the defects become permanent. In other words, the homogeneity parameter $\Delta C$ associated to a voxel $U_i$ may relate to the allowed difference between a maximum value and a minimum value of polymerization rate Cv in a determined zone including the considered voxel $U_i$. This zone may for instance be the size of the voxel. Without being bound by theory, the inventors estimate that once the material is solid, the un-reacted monomers and the polymer network are less susceptible to be able to rearrange.

In practice, the critical Jacobs energy Ec should be reached within the layer after the H hardening steps defined by the kinetic parameter.

Alternatively, the homogeneity parameter $\Delta C$ may represent a ratio between the maximum and minimum value or an amount of area having a polymerization rate smaller than a threshold or conversely higher than a threshold; it may relate to any other value enable to represent homogeneity of material properties, for example standard deviation, values at three sigma . . .

Other types of homogeneity parameters are possible even if a difference of polymerization or homogeneity rate is not expressed directly. For example, the homogeneity parameter may be related only to a given type of cycles of projection of predetermined image patterns (i.e. of predetermined sets of pixels) within a predetermined list of such cycles.

A further parameter that is possible to adjoin to the manufacturing file is a target polymerization rate % $C_T$ to reach in a voxel $U_i$ before a final global curing step.

It is to be noted that due to interspaces between pixels and light absorption, the light dose received inside the voxel is not even. The abovementioned parameter of the target polymerization rate may thus be set considering a mean value inside the voxel or a max value inside the voxel. In one embodiment the max value is considered so as to control that the polymerization does not increase too rapidly in any point of the voxel.

As previously explained, this polymerization rate % $C_T$ is generally reached in more than one irradiation since light has a finite penetration depth and the layer thickness is usually much smaller than this Dp. Hence, it is only when the voxel $U_i$ is separated from the light source by a curable material having a thickness bigger than the light penetration depth, often up to 2 or 3 times the value of the light penetration depth as defined in the Jacobs publication, that the light dose received by the curable material 50 of this voxel becomes negligible in view of pursuing the polymerization reaction.

Thus, the material polymerization rate Cv can progressively raise by the multiple exposures that will be done through the layer by layer technique. The total light dose (or total intensity of curing surface energy E) received by a voxel $U_i$ will increase, even after reaching a solid state, through the several light exposures during production, those light exposures being more and more distant as the part is being built.

In an embodiment, the target polymerization rate % $C_T$ for each voxel $U_i$ is determined so as to be higher than or equal to the polymerization rate Cv corresponding to the critical Jacobs energy Ec.

In practice, this target polymerization rate % $C_T$ is chosen to be in each voxel $U_i$ higher than or equal to the polymerization rate Cv corresponding to a recommended energy $E_{JR}$ derived from the Jacob's equation previously introduced (by definition of the Jacob's equation, the recommended energy $E_{JR}$ is higher than the critical Jacobs energy $E_C$). In practice, this recommended energy $E_{JR}$ is set to provide enough energy to harden into a solid state a layer having a thickness increased by about 50% to about 200% than the actual layer. In other words, the recommended energy $E_{JR}$ may be comprised between the energy necessary to harden a layer 150% thicker than the considered layer and the energy necesssry to harden a layer 300% thicker than the considered layer.

For the present example, the target polymerization rate % $C_T$ is chosen to be greater than 95% in the skin 21, and greater than 80% in the core 22.

In other words, this target polymerization rate % $C_T$ varies at least between one voxel $U_i$ and another.

In the above examples, the illustrated optical device is planned to be manufactured while having a "core-skin" structure as presented above. However it is to be noted that the principle of the invention applies to files for manufacturing other structures, as long as kinetic and/or homogeneity and/or conversion rate parameters are attached to the different part of the device within the manufacturing file. For example, the invention may concern also devices built wholly according to the process presented for the core area 22, as long as the kinetic parameter is attached to the different voxels, or devices further comprising a more solid or quicker polymerized core . . .

At this step, at least a first data processor is used to generate a first manufacturing file comprising data relating to:
the positions x, y, z of the voxels $U_i$ to be cured,
the number H of curing steps necessary to reach the threshold energy T1,
the value of the homogeneity parameter $\Delta C$ around the voxel, and the target polymerization rate % $C_T$ to reach in each voxel $U_i$ before the final global curing step.

This first manufacturing file may then be accessed by at least a second data processor in order to be processed.

The at least one second data processor then runs an optimization processing loop that processes said first manufacturing file by:

adding some voxels $U_i$ and/or removing some voxels $U_i$ and/or changing some of the position data x, y, z associated to a voxel and/or changing the number H and the applied surface energy E associated to a voxel according to a given rule (for instance a conflict-managing-rule) related to a given manufacturing process.

To understand the relevance of this optimization processing loop and in what it consists in, we can contemplate an illustrative example. In this example, a device is planned to be manufactured using a predetermined curable material and predetermined energy source according to which the depth penetration Dp is of 70 μm, the critical Jacobs energy Ec is of 7 mJ, the attenuation factor is of 1/Dp, the solid state occurs above a conversion rate of 70%, and the device is to be manufactured with a skin width of 3 voxels, using layers of thickness of 10 μm; within the core area, the inhomogeneity parameter is set to having less than 6% (relative) inhomogeneity as measured in conversion rate.

At each curing step, in order to satisfy to the kinetic parameters in the different places it is planned to directly apply on each layer a total dose of 2 mJ in the core 22 and of "α" mJ in the skin 21 of the optical element 100, "α", being nominally chosen to be of about 10 mJ, so as to provide on the skin a conversion rate slightly above the solid state.

However, in the upper part of the optical element 100 (FIG. 8) there is a risk to apply too much energy too quickly in regions situated below the skin 21. Indeed, part of the UV light used to irradiated such voxel of the skin would transfer to voxel or part of a voxel having a lower kinetic parameter, for example of the core 22, which are situated close to or in contact with said voxel of the skin along a direction of transmission of light from the energy source. To reduce as much as possible this effect, the at least one second processor amends the chosen value for a to 7.56 mJ for such voxels of the skin directly above a voxel of the core. This value is indeed the minimum value ensuring a solid wall on the edges of the optical element 100.

Further, in the downskin parts of the optical element 100 (FIG. 7) there is a risk to apply some energy to regions situated below the skin and thus outside the contour of the optical element creating a shape error. In spite of this, since it is desired to solidify completely the skin 20, here again, the at least one second processor amends the chosen value for α to 7.56 mJ for the pixel situated on the external surface of the lower part of the optical element 100 (and that would still form excess material for a thickness of about 12 or 13 voxels in our example). Whereas if a normal value of a of about 10 mJ, the excess thickness of material would be of about 15 to 16 voxels.

In other words, the skin 21 risks in practice to have a width that is greater than the desired value in upskin parts and downskin parts of the manufactured device.

More generally, it is physically not possible to manufacture the optical element 100 by exactly following all the instructions given by the first manufacturing file.

To reduce as much as possible the difference between these instructions and the obtained optical element 100, the optimization processing loop consists in considering the whole optical element 100 by virtue of the relationships between its voxels (and not in considering the voxels independently from each other). That is why this loop may consist in cancelling some of the voxels to be cured (the ones situated near the boundary of the optical element 100) and/or in modifying the parameters associated to each voxel, so that during manufacturing the provided amount of energy is adapted to the situation.

In practice, one solution to manage the upskin and downskin problems is to reduce the skin size in the upper and lower parts of the optical element 100 in order to compensate the impact of the high amount of applied curing surface energy E. In addition or alternatively, it is possible to modify the shape of the down skin regions of the optical element.

The optimization processing loop is developed in order to fulfill some merit functions linked to the respect of the data model given by the first manufacturing file. For instance, the rules may be, but need not be limited to:

a respect of the desired geometry C0 of the optical element 100, a percentage of voxels of the skin (and core) respecting the data model, at the center of the lens, a minimum ratio between core and skin along the axis $L_L$ (requiring for instance that the core is at least 4 times larger than the skin).

At this stage in the description, the at least second processor also determines the means to satisfy the homogeneity parameter.

Due to the fact that the dose received in the inter-pixel region is much lower than the one received inside the pixel (typically fewer than 20%), reaching a good homogeneity can be done by moving the pixelated pattern (ie the pixel grid) from one layer to another.

The objective is to calculate the minimal number of pixel grid movements to reach the desired homogeneity. In such case the attenuation of light intensity through the material is considered within the calculation of a set of pixel grid movements.

Thus the at least one second processor may access a database of set of image patterns and may chosen the following set of image patterns:

0.5 pixel in the X direction between a first and a second layer, 0.5 pixel in the Y direction between the second and a third layer, −0.5 pixel in the X direction between the third and a fourth layer, −0.5 pixel in the Y direction between the fourth and a fifth layer (then, the shifting process restarts from the beginning).

This solution consisting in shifting four times the pattern which theoretically enables to obtain a minimum light dose in each layer of the core 22 that corresponds to a conversion rate of 83.5% and a maximum light dose that corresponds a conversion rate of 88.3%, ensuring a low inhomogeneity, of 5% of absolute conversion rate, and 5.7% relative. It is to be noted that these value are obtained via a computational simulation of the process and are not measured values. Though, the computational simulation is based on some assumptions, and it is thus probable that there are differences between simulation values and experimental ones.

Alternatively, the set of image patterns and there successive shifts may have been predetermined in the earlier manufacturing file.

The at least one second processor then outputs a completed second manufacturing file.

Alternatively, the at least one second processor is common with the at least first processor, and the above mentioned computation is done while generating the first manufacturing file, for example when the manufacturing machine is set and its parameters are known before creating the first manufacturing file.

Once output, the completed second manufacturing file may be accessed or transmitted to at least one processor of the computer 6 of the manufacturing machine 1.

The computer 6 may then run a transformation processing loops as to provide a completed and final manufacturing file, based on the second manufacturing file (or on the first manufacturing file), in which the energy and behaviour of the energy source is computed for each layer in view of respecting the second manufacturing file. The computer 6 may thus output a final manufacturing file. Further, in an embodiment, the at least one second processor is part of the computer 6, and the computation presented above in view of the second processor for outputting the second manufacturing file are done as an intermediate step by the computer 6 based on the first manufacturing file while computing the final manufacturing file. In which case, the computer 6 accesses directly to the first manufacturing file.

The manufacturing machine 1 is then able to manufacture the optical element 100 according to the final manufacturing file using at least a manufacturing processor to read and interpret instructions carried by the final manufacturing file.

The goal of the transformation is to transform the manufacturing file into data related to values of curing surface energy E to be directly applied on the surface 55 of each voxel $U_i$, said data being used to generate said completed and final manufacturing file.

When all the curing steps are achieved, the optical element 100 can be handled and transported in order to be processed by another machine. Here, this other machine is able to operate a further final step of complete curing of all the curable material 50 of the optical element 100, thanks to an UV light curing or a thermal curing.

Then, the optical element is ready to be processed in order to finish it. As explained above, this finishing process may be of the additive type or of the subtractive type.

We can now consider other embodiments of the invention.

In an alternative embodiment, each voxel may be associated to position data and to only one other parameter (a kinetic parameter). For instance, this parameter may be the above mentioned number H of production steps that are needed and necessary before the material reaches the critical Jacobs energy Ec.

In a third embodiment, the optical element 100 comprises more than two different areas (the skin, the core and at least a third area), each area having different values for at least parameters.

Figure 9:
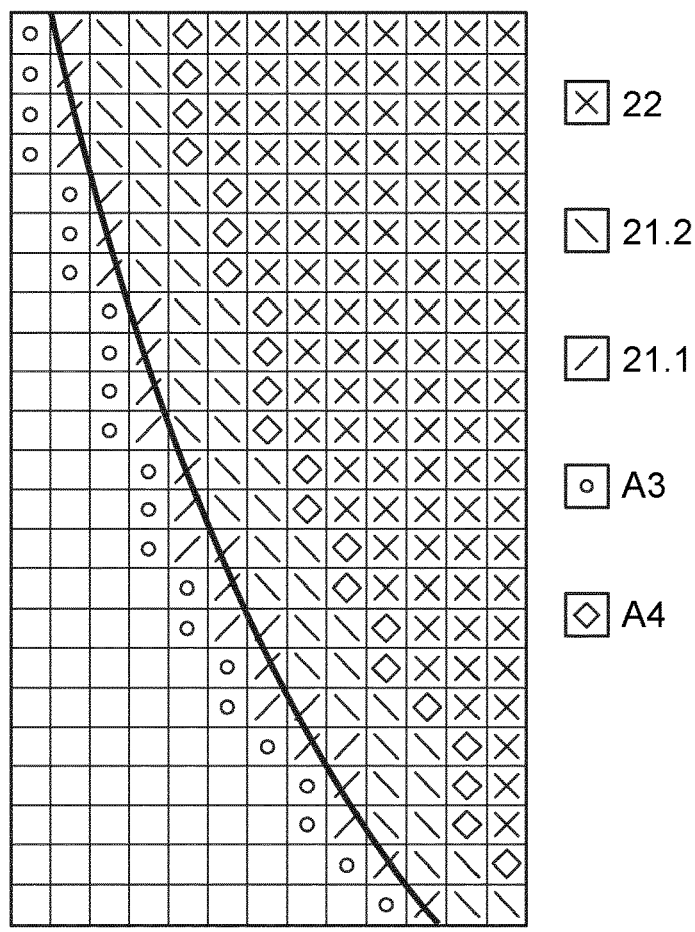
FIG. 9 is a view similar to that of FIG. 4 that shows different areas of the optical element.

As shown in FIG. 9, the optical element 100 may comprise a skin 21, a core 22 situated inside the skin 21 and a third area A3 situated outside the skin 20.

Before giving details on this third area A3, we can note on FIG. 9 that the skin 21 is divided into two zones 21.1 and 21.2, the zone 21.1 being intended to be polymerized only if the post-process is of the subtractive type.

The third area A3 has here a width smaller or equal to that of the skin (for instance a width of 1 or 2 pixels).

The total curing surface energy E applied onto this third area A3 (corresponding to the target polymerization rate % $C_T$) has an intensity I3 that is different from the intensity I1 of the curing surface energy E applied onto the skin 21, said intensity I3 being preferably smaller than the intensity I1.

Thanks to its low mechanical strength, the mater in intermediate state, neither solid nor completely liquid, can also fill in the staircase and make the shape of the lens more round and close to the original design, before submitting the lens to a final curing step (which final step will be described after).

As shown in FIG. 9, the optical element may comprise a fourth area A4 situated between the skin 20 and the core 22.

The curing surface energy E applied onto this fourth area A4 has an intensity I4 that is different from the intensities I1, I2 of the curing surface energy E applied onto the skin and the core, said intensity I4 being preferably smaller than the intensity I2.

The intensity I4 is preferably such that the curable material 50 in this fourth area A4 remains in a liquid or intermediate state (so as to be of lower mechanical strength than the core 22).

Hence, this area can counter the shrinkage of the optical element 100. Indeed, when the core 22 is polymerized, it retracts. Then the space created along the fourth area A4 can easily be refilled with curable material 50 to prevent the emergence of lacunas in the optical element 100.

In a further embodiment, the voxels are assigned to areas or regions. For instance, the manufacturing file may follow the rule according to which:
- a voxel entirely comprised in a specific area or region is assigned to said area or region
- at the interface between the core and the skin, a voxel intersecting the skin is considered into the skin,
- at the interface between the skin and an allowance region provided in anticipation of a lens surfacing step, a voxel intersecting the interface is considered into the skin,
- at the interface between the allowance region and a buffer region provided on the external face of the allowance region, a voxel intersecting the interface is considered into the allowance region,
- at the interface between the buffer region and the liquid region in the container, a voxel intersecting the interface is considered into the liquid region,
- at the interface between the skin and a buffer region provided in anticipation of a lens coating step, a voxel intersecting the interface is considered into the buffer region,
- at the interface between the buffer region and an allowance region provided on the external face of this buffer region, a voxel intersecting the interface is considered into the allowance region, and
- at the interface between the allowance region and the liquid region, a voxel intersecting the interface is considered in the liquid region.

Such rules are exemplary and further or different rules may apply depending on the process used to manufacture the device.

The invention claimed is:

1. A method for outputting a manufacturing file for producing an optical element from a curable material by using an additive manufacturing technology, comprising:
   acquiring a desired geometry of the optical element;
   obtaining a discretization of the desired geometry in volume units described by data relative to position parameters of the volume units and to the dimension of the volume units;

and further comprising:
associating at least a volume unit with a kinetic parameter that enables control of a curing pace imposed to the curable material of said at least a volume unit;
producing, using at least one processor, a manufacturing file comprising said data and said kinetic parameter associated to said at least a volume unit for manufacturing at least the optical element; and
outputting said manufacturing file;
wherein control of the curing pace controls optical homogeneity between the cured volume units.

2. The method according to claim 1, wherein, for at least one volume unit, said kinetic parameter has a value that imposes the curing of the curable material in at least two curing steps and that imposes that said one volume unit does not reach a solid state after the first of these two curing steps, each curing step comprising the providing of a non-null energy to said one volume unit directly or indirectly through other volume units.

3. The method according to claim 1, wherein at least one kinetic parameter associated to a first volume unit determines a number of curing steps needed and necessary for the first volume unit to receive a total curing surface energy that is equal to or higher than a predetermined threshold (T1), said number (H) being an integer equal to or higher than 1, each curing step comprising the providing of a non-null energy to the first volume unit directly or indirectly through other volume units.

4. The method according to claim 3, wherein said number is equal to or higher than 2 and wherein the kinetic parameter implies that the first volume unit receives said curing surface energy through:
a first step of providing a first part of the curing surface energy directly to the first volume unit, said first part being equal to or higher than an induction surface energy; and
at least a second step of providing a second part of the curing surface energy through a second volume unit positioned between the first volume unit and an energy source that emits the curing surface energy (E).

5. The method according to claim 3, wherein said predetermined threshold is determined for the first volume unit by using the Jacobs equation:

$$Ej = Ec \cdot e^{th/Dp}$$

wherein:
Ej a first Jacobs energy from which said energy threshold derives, said energy threshold being equal to or higher than said first Jacobs energy;
th the thickness of the volume unit;
Dp the depth penetration of the curing energy within the curable material; and
Ec a critical Jacobs energy defined for the curable material.

6. The method according to claim 5, wherein said predetermined energy threshold is equal to the critical Jacobs energy (Ec).

7. The method according to claim 1, wherein a difference in the kinetic parameter associated to two volume units indicates that one of the two volume units needs to be cured faster than the other one.

8. The method according to claim 1, wherein each volume unit of said volume units is associated to a target value of received curing surface energy or of polymerization rate to reach before a final global curing step, and wherein said target value varies from at least one of said volume units to another one of said volume units.

9. The method according to claim 8, wherein said at least a volume unit is associated with a homogeneity parameter that relates to local curing inhomogeneities in the curable material and wherein the homogeneity parameter relates to difference between a maximum value and a minimum value of curing surface energy or of polymerization rate when the material reaches an energy threshold in a determined zone.

10. The method according to claim 8, wherein the optical element being designed to be post-processed, said target value is determined as a function of the desired geometry-of the optical element and as a function of at least one of the following processing parameters:
the type of post-process, said post-process being of the subtractive type or of the additive type;
the geometry of the volume units;
the reference or type of the machine used to manufacture the optical element;
and wherein the manufacturing file is produced as a function of said processing parameter.

11. The method according to claim 1, wherein said at least a volume unit is associated with a homogeneity parameter that relates to local curing inhomogeneities in the curable material.

12. The method according to claim 11, wherein the homogeneity parameter implies, for at least one value of the homogeneity parameter, the forming of a volume unit in sub-steps of:
projecting a first pixelated image pattern onto the curable material, and then
projecting another pixelated image pattern onto the curable material so that most of the pixels of this other image pattern overlay at least two pixels of the first projected image pattern.

13. The method according to claim 1, wherein the optical element comprises an optical lens.

14. A method for outputting a completed manufacturing file for producing an optical element from a curable material by using an additive manufacturing technology, comprising:
acquiring a manufacturing file output according to a method as claimed in claim 1;
running, using at least a processor, an optimization processing loop that processes said manufacturing file by adding and/or removing some volume units and/or by changing some of the data or kinetic parameter associated to at least one volume unit according to a conflict-managing-rule related to a given manufacturing process; and
outputting said completed manufacturing file.

15. A method for outputting a final machine instruction file, comprising:
receiving a manufacturing file output according to a method as claimed in claim 1;
running a transformation processing loop using a data processor adapted to transform the manufacturing file into data related to values of curing surface energy to be directly applied on the surface of each of said volume units, said data being used to generate a completed manufacturing file; and
outputting said final machine instruction file which may be accessed by a manufacturing processor of a manufacturing machine able to manufacture an optical element based on said completed manufacturing file.

16. A data processor programmed for:
acquiring a manufacturing file output according to a method as claimed in claim 1;
running an optimization processing loop that processes said manufacturing file by adding and/or removing some volume units and/or by changing some of the data or kinetic parameter associated to at least one volume unit according to a conflict-managing-rule related to a given manufacturing process; and outputting a completed manufacturing file.

17. A manufacturing machine for manufacturing an optical element from a curable material using an additive manufacturing technology comprising:

a container suitable for containing a curable material;
a support suitable for supporting the optical element;
a forming system suitable for curing said curable material; and
a data processor programmed for:
  receiving a manufacturing file output according to a method as claimed in claim 1;
  running a transformation processing loop adapted to transform the manufacturing file into data related to values of curing surface energy to be directly applied on the surface of said at least a volume unit, said data being used to generate a completed manufacturing file; and
  manufacturing an optical element based on said completed manufacturing file.

* * * * *